United States Patent [19]

Okada

[11] Patent Number: 5,073,922
[45] Date of Patent: Dec. 17, 1991

[54] COMMUNICATION TERMINAL APPARATUS

[75] Inventor: Naoyuki Okada, Kanagawa, Japan

[73] Assignee: Canon Kabushiki Kaisha, Tokyo, Japan

[21] Appl. No.: 540,797

[22] Filed: Jun. 20, 1990

Related U.S. Application Data

[63] Continuation-in-part of Ser. No. 283,857, Dec. 13, 1988, abandoned.

[30] Foreign Application Priority Data

Dec. 16, 1987 [JP] Japan ................................ 62-316003

[51] Int. Cl.⁵ .................... H04M 3/42; H04M 1/72
[52] U.S. Cl. .................................. 379/164; 379/173; 379/373
[58] Field of Search ............... 379/373, 164, 171, 172, 379/173, 217, 375

[56] References Cited

U.S. PATENT DOCUMENTS 4,782,518 11/1988 Mattley et al. ................. 379/373 X Primary Examiner—Stafford D. Schreyer
Attorney, Agent, or Firm—Fitzpatrick, Cella, Harper & Scinto

[57] ABSTRACT

A communication terminal apparatus is used in a network system in which a sub address is affixed to a subscriber apparatuses from each other. A proper incoming call indicating tone is registered beforehand in correspondence with a sub address, and an incoming call indicating tone which has been registered in accordance with the sub address is output when a terminating call is received. In consequence, a called terminal can be discriminated by the incoming call indicating tone. Further, a desired incoming call terminating tone can be heard.

12 Claims, 5 Drawing Sheets

COMMUNICATION TERMINAL APPARATUS

CROSS REFERENCED RELATED APPLICATIONS

This application is a Continuation-In-Part of application Ser. No. 07/283,857 filed Dec. 13, 1988 abandoned.

BACKGROUND OF THE INVENTION

1. Field of the Invention

The present invention relates to a communication terminal apparatus, more particularly, to a communication terminal apparatus used in a network system operated with a subscriber number affixed with a sub address to enable a plurality of communication terminal apparatuses to be discriminated from each other.

2. Description of the Prior Art

Conventionally, communication terminal apparatuses (hereinafter referred to as terminals) such as telephones are used jointly by a plurality of users. However, incoming call indication ring of telephones or the like do not indicate which person is being called, and the user does not know the called person until he gets the call.

SUMMARY OF THE INVENTION

An object of the present invention is to provide a improved communication terminal apparatus.

Another object of the present invention is to provide a communication terminal apparatus which is capable of eliminating the aforementioned problem of a conventional apparatus and which enables a desired ringing tone to be heard.

A further object of the present invention is to discriminate a sub address by the sub address discriminating means and to output an incoming call indicating tone from an incoming call indicating tone outputting means corresponding to the sub address when a terminating call is received. The proper incoming call indicating tone is registered beforehand by an incoming call indicating tone registration means in correspondence with the sub address.

A further object of the present invention is to provide a communication terminal apparatus in which a called person can be discriminated by the incoming call indicating tone and further, a desired incoming call indicating tone can be heard.

The above and other objects, advantages and features of the present invention will become more readily apparent from the following specification.

DESCRIPTION OF THE PREFERRED EMBODIMENT

An embodiment of the present invention will be described in detail with reference to the accompanying drawings in which the communication terminal apparatus according to the present invention is applied to a digital telephone set connected to an integrated services digital network (ISDN) system.

Figure 3:
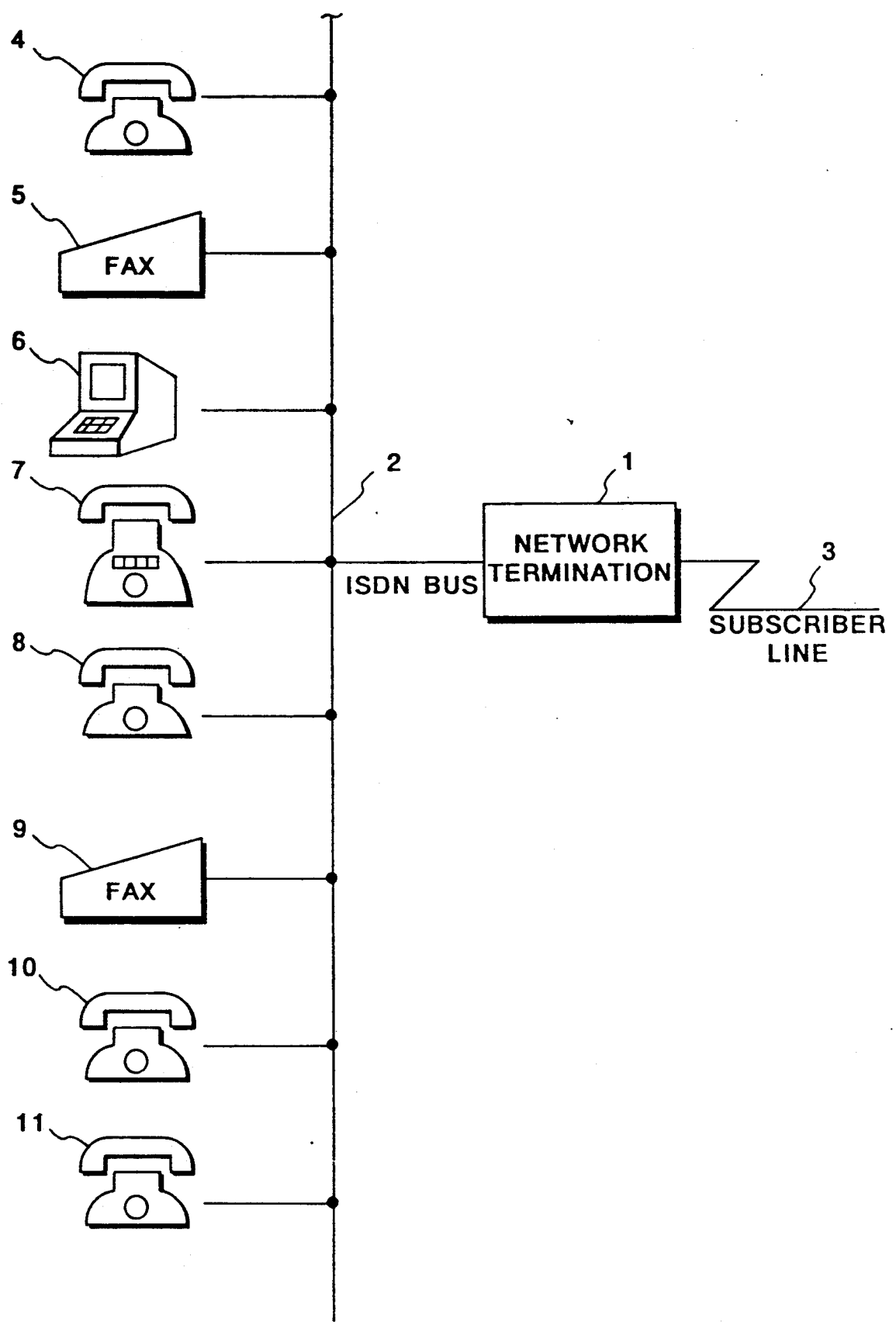
FIG. 3 shows the connection of an ISDN.

Referring first to FIG. 3 which shows the connection of the ISDN system, a network termination 1 is connected to a plurality of terminal apparatuses 4 to 11 by an ISDN bus 2. The network termination 1 is connected to an ISDN switching system (not shown) by a subscriber line 3. The terminal apparatuses 4, 8, 10 and 11 comprise general digital telephone sets, the terminal apparatuses 5 and 9 comprise facsimile devices, the terminal apparatus 6 is a telex device, and the terminal apparatus 7 is digital telephone device of the present embodiment.

Figure 2:
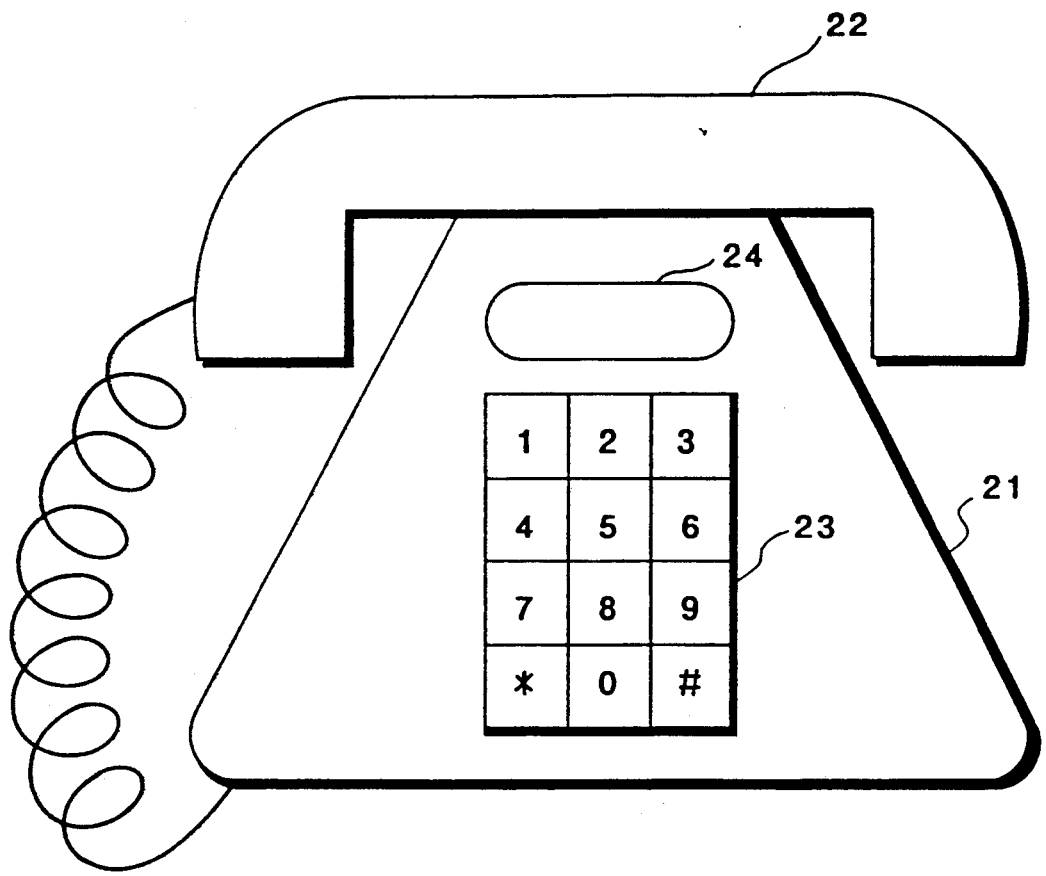
FIG. 2 is an external view of the digital telephone set of FIG. 1.

FIG. 2 shows the external view of the digital telephone set of the present embodiment. In FIG. 2, the digital telephone set has a digital telephone set body 21, a handset 22, key buttons 23 from which a telephone number or the like is input, and a speaker 24 for producing an incoming call indication tone or the like.

Figure 1:
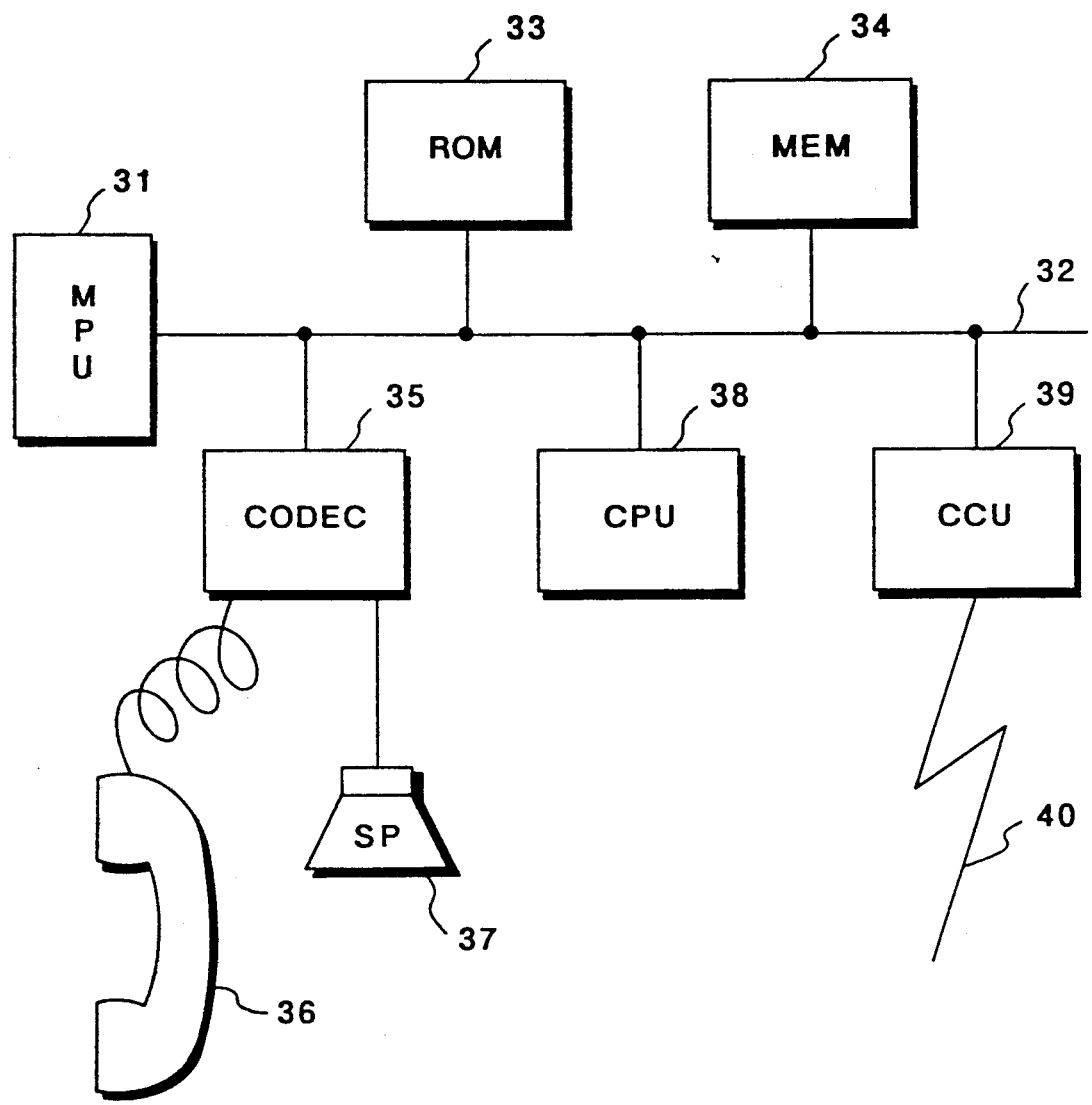
FIG. 1 is a block diagram of a digital telephone set used in an embodiment of the present invention.

FIG. 1 is a block diagram of the digital telephone set of the present embodiment, showing the structure thereof. The digital telephone set includes a micro processing unit 31 (hereinafter referred to as an MPU) for controlling the digital telephone set in accordance with a predetermined control program, an internal bus 32 for the MPU 31, a ROM 33 for storing the control program, a memory 34 for storing a registered incoming call indicating tone, the memory 34 also serving as an auxiliary memory, a sound converting unit 35 (hereinafter referred to as a CODEC), a handset 36, a speaker 37, a key operation unit 38 (hereinafter referred to as an OPU), a communication control unit (hereinafter referred to as a CCU), and an ISDN bus 40. A power source (not shown) supplies power to the units of FIG. 1 independent of hook state as is well known in the art.

Figure 4:
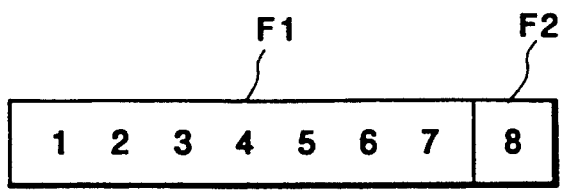
FIG. 4 shows a number system for the ISDN.

FIG. 4 shows a number system used in the ISDN. The number includes a subscriber number portion F1, and a sub address portion F2.

Next, the operation of this embodiment will be described.

Figure 5:
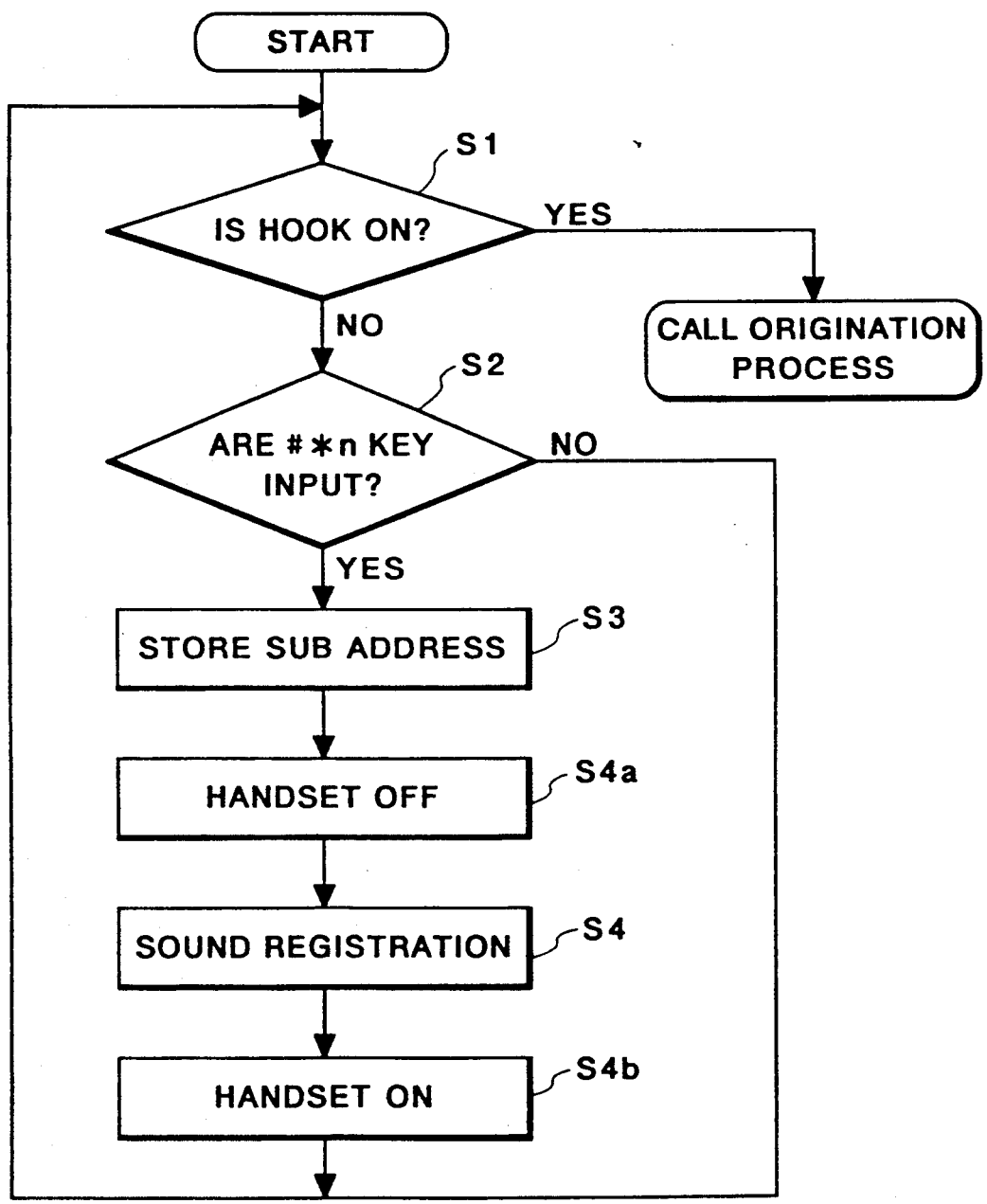
FIG. 5 is a flow chart of an incoming call indication tone registration process.

FIG. 5 is a flow chart of the operation of registering an incoming call indicating tone which corresponds to a sub address. First, connection/disconnection of a hook switch which is attained by lifting up or placing the handset 36 is detected in step S1. If it is detected that the switch has been connected, the flow goes to a normal call origination processing. If it is detected that the switch is disconnected, it is detected whether or not the key operation needed for starting the registration of a sound corresponding to a sub address (e.g., the key input in order of #→*→1) is performed in step S2. If no key is operated, the flow returns to step S1 to continue supervision of a hook and keys.

If it is detected that the keys required to start registering a sound are operated, a sub address which has been input using keys in step S2 is stored in the memory 34 in step S3. Next, it has been confirmed that the handset 36 is off from the cradle in step S4a. In step S4, the aural input from the handset 36 is converted to a digital data by the CODEC 35, the resultant digital data is registered in the memory 34 in correspondence with the sub address. Any aural source such as a tone producing device well known in the art may be employed. Then the handset 36 is set on the cradle in step S4b, thereby completing a registration process, the flow thereby returning to step S1.

Figure 6:
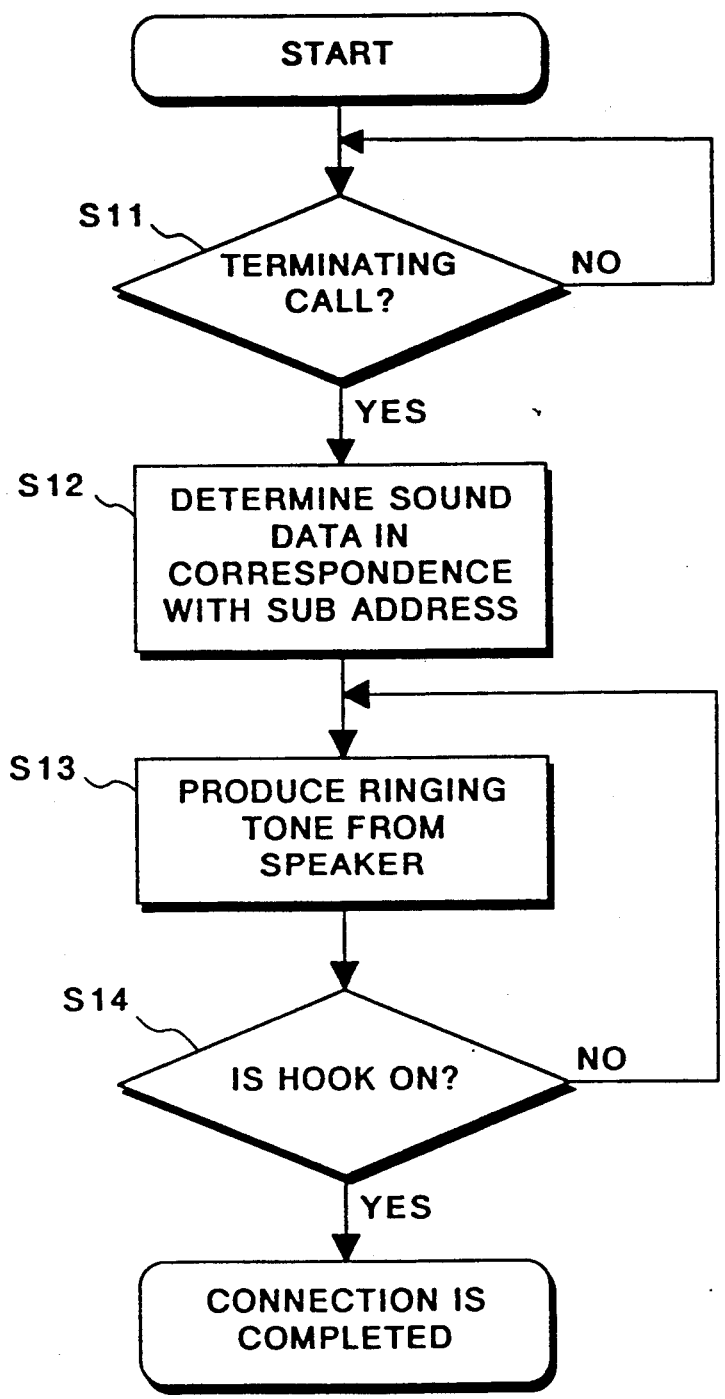
FIG. 6 is a flow chart of a ringing tone generating process.

FIG. 6 is a flow chart of the process of generating a ringing tone when a terminating call is received.

In step S11, it is detected whether or not a terminating call is received. If a terminating call occurs, the flow goes to step S12 where a sub address is discriminated from a sub address field in a terminating call signal and sound information registered in the memories 34 is retrieved by the MPU 31. Subsequently, in step S13, the aural information retrieved in step S12 among the aural information registered in step S4 in the process shown in FIG. 5 is delivered to the CODEC 35, and a ringing tone is then produced from the speaker 37. Next, it is determined whether or not the hook is on in step S14. The process returns to step S13 to continue producing a ringing tone from the speaker so long as it is determined that the hook is on. Once the hook becomes off, the ringing tone stops, completing a normal connection operation.

In the present embodiment, the present invention is applied to a telephone set. However, it can also be applied to any of communication terminal apparatuses other than the telephone set.

As will be understood from the foregoing description, in the case where one telephone set is operated in a household or the like in the system where a sub address can be affixed to one subscriber number, as in the ISDN, and where a plurality of terminals are accommodated on one subscriber line, since various ringing tones can be set in the memory corresponding to the number of sub addresses, a call receiver corresponding to a ringing tone can be made ready for receiving a call. This can eliminate an overhead needed for exchanging a telephone speaker which occurs in a charging state, reducing the communication cost.

While but one embodiment of the present invention has been described, it will be apparent to those skilled in the art that various modifications and variations may be made therein without departing from the spirit and scope of the invention as claimed.

What is claimed is:

1. A communication terminal apparatus employed in a network system operated with a subscriber number affixed with a sub address so as to allow a plurality of communication terminal apparatuses to be discriminated from each other, comprising:
   a sub address discriminating means for discriminating a plurality of sub addresses from each other;
   an incoming call indication tone registration means for registering a proper incoming call indication tone through a handset in correspondence with a sub address; and
   an incoming call indication tone outputting means for outputting an incoming call indication tone which has been registered in said incoming call indication tone registration means in accordance with said sub address when a terminating call is received.

2. A communication terminal apparatus according to claim 1, wherein said incoming call indicating tone registration means has a memory area for each sub address, and stores an incoming call indicating tone which is characteristic to said memory area.

3. A communication terminal apparatus according to claim 2, wherein said each of said memory areas stores incoming call indicating tone data corresponding to the respective sub address and wherein said incoming call indicating tone outputting means reads out incoming call indicating tone data from a memory, and outputs an incoming call indicating tone on the basis of said incoming call indicating tone data which has been read out.

4. A communication terminal apparatus according to claim 1, wherein said incoming call indicating tone outputting means detects a terminating call signal, discriminates a sub address contained in said terminating call signal, and outputs an incoming call indicating tone in accordance with said sub address which has been discriminated.

5. A communication terminal apparatus according to claim 1, wherein said network system is a digital network system.

6. A communication terminal apparatus according to claim 1, further comprising a plurality key input means, registration of an incoming call indicating tone by said incoming call indicating means being performed by the input of particular key input means.

7. A communication terminal apparatus employed in a network system operated with a subscriber number affixed with a sub address so as to allow a plurality of communication terminal apparatuses to be discriminated from each other, comprising:
   a sub address discriminating means for discriminating a plurality of sub addresses from each other;
   an incoming call indication tone registration means having a respective incoming call indication tone already stored in correspondence with each of said sub addresses; and
   an incoming call indication tone outputting means for outputting an incoming call indication tone which has been registered in said incoming call indication tone registration means in accordance with a discriminated sub address which is associated with an incoming call.

8. A communication terminal apparatus according to claim 7, wherein said incoming call indicating tone registration means has a memory area for each sub address, and stores an incoming call indicating tone which is characteristic to said memory area.

9. A communication terminal apparatus according to claim 8, wherein each of said memory areas stores incoming call indicating tone data corresponding to the respective sub address, and wherein said incoming call indicating tone outputting means reads out incoming call indicating tone data from a memory area, and outputs an incoming call indicating tone on the basis of said incoming call indicating tone data which has been read out.

10. A communication terminal apparatus according to claim 7, wherein said incoming call indicating tone outputting means detects a terminating call signal, discriminates a sub address contained in said terminating call signal, and outputs an incoming call indicating tone in accordance with said sub address which has been discriminated.

11. A communication terminal apparatus according to claim 7, wherein said network system is a digital network system.

12. A communication terminal apparatus according to claim 7, further comprising a plurality of key input means, registration of an incoming call indicating tone by said incoming call indicating means being performed by the input of particular key input means.

* * * * *

UNITED STATES PATENT AND TRADEMARK OFFICE
CERTIFICATE OF CORRECTION

PATENT NO.   : 5,073,922
DATED        : December 17, 1991
INVENTOR(S)  : NAOYUKI OKADA It is certified that error appears in the above-identified patent and that said Letters Patent is hereby corrected as shown below:

AT [57] ABSTRACT

Line 3, "scriber apparatuses" should read
        --scriber number to discriminate a plurality
          of communication terminal apparatuses--.

COLUMN 3

Line 29, "memory" should read --number--.

COLUMN 4

Line 15, "plurality key" should read --plurality of key--.
    Line 52, "indicating" should read --indication--.

Signed and Sealed this

Third Day of August, 1993

Attest:

MICHAEL K. KIRK

*Attesting Officer*     *Acting Commissioner of Patents and Trademarks*